United States Patent [19]

Krueger

[11] 4,019,001

[45] Apr. 19, 1977

[54] PNEUMATIC TIMER

[75] Inventor: Keith T. Krueger, Bellefontaine, Ohio

[73] Assignee: I-T-E Imperial Corporation, Spring House, Pa.

[22] Filed: May 5, 1975

[21] Appl. No.: 574,597

[52] U.S. Cl. .................................. 200/34; 267/114

[51] Int. Cl.² ...................... H01H 7/03; F16F 15/00

[58] Field of Search ................ 58/1; 200/34, 61.04, 200/83, 34; 267/114; 251/51, 55, 61; 91/38; 92/96

[56] References Cited

UNITED STATES PATENTS

| | | | |
|---|---|---|---|
| 2,662,594 | 12/1953 | Schaefer | 200/34 X |
| 2,996,155 | 8/1961 | Priesemuth | 200/34 X |
| 3,578,767 | 5/1971 | Lee | 200/61.04 X |
| 3,599,419 | 8/1971 | Anderson | 58/1 R |
| 3,912,247 | 10/1975 | Ward | 267/114 |

*Primary Examiner*—James R. Scott

*Attorney, Agent, or Firm*—Ostrolenk, Faber, Gerb & Soffen

[57] ABSTRACT

A pneumatic timer is constructed by stacking a calibration subassembly on top of a diaphragm housing stacked above a diaphragm subassembly, and including a filter capsule subassembly interposed between the calibration subassembly and the diaphragm housing. The filter capsule subassembly includes a check valve disposed within a recess so constructed that all air entering the recess must pass through filter screens disposed on opposite sides of the check valve. The biasing spring for the check valve bears against one of the screens and biases the movable valve member to a normal position bearing against the other screen. The second screen is flexible so that at the end of the reset stroke the plunger attached to the timing chamber diaphragm mechanically opens the check valve.

10 Claims, 29 Drawing Figures

FIG. 1
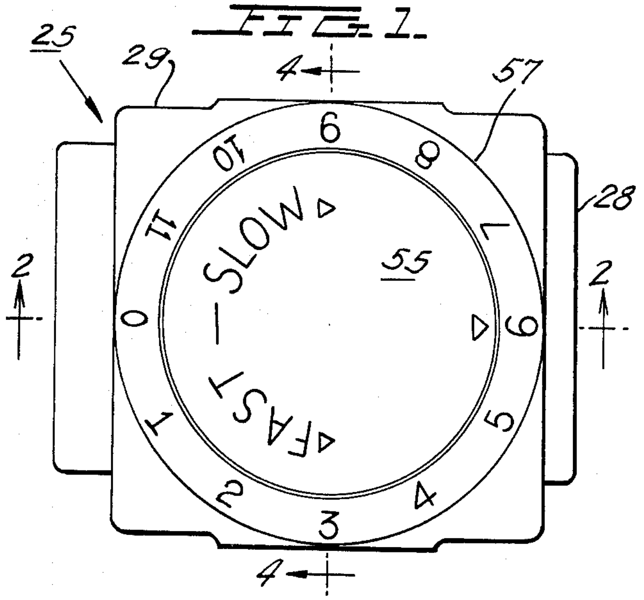
FIG. 3
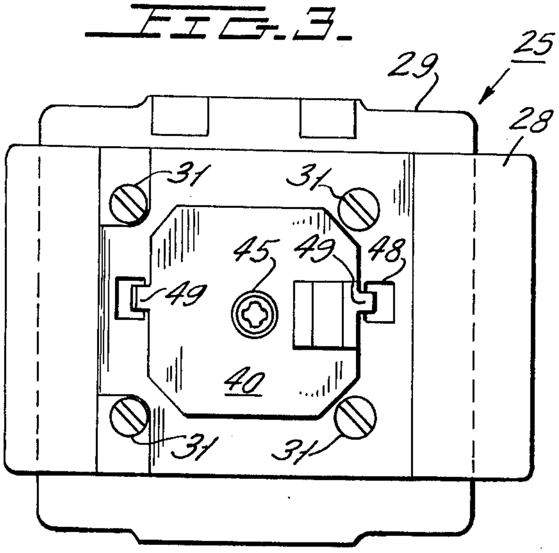
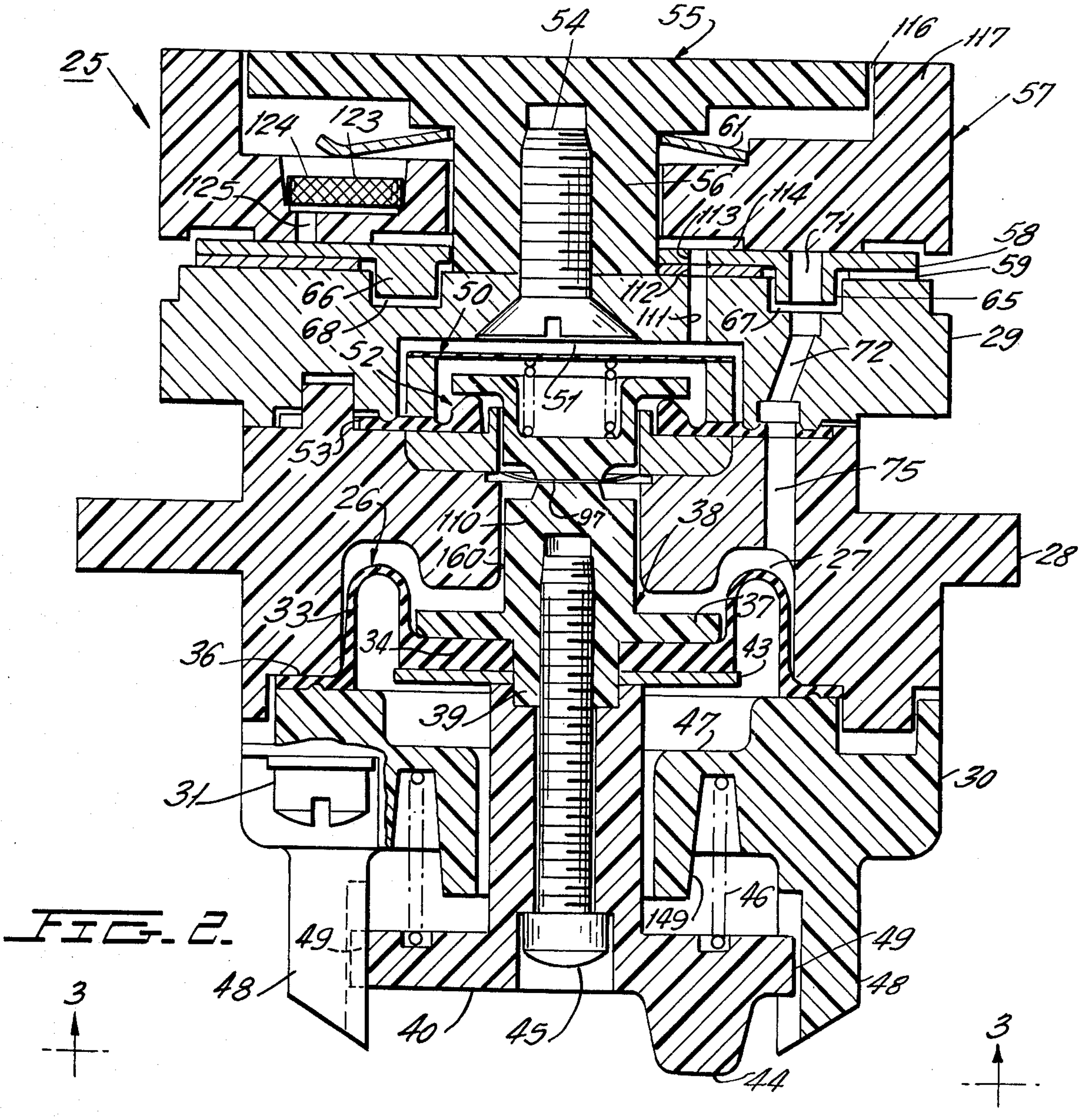
FIG. 2

FIG. 5.
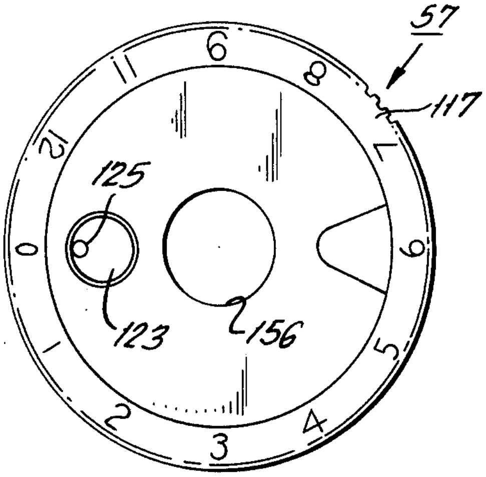
FIG. 4.
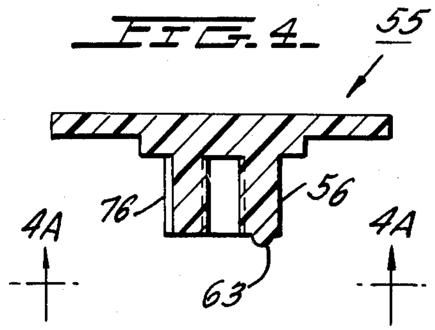
FIG. 5A.
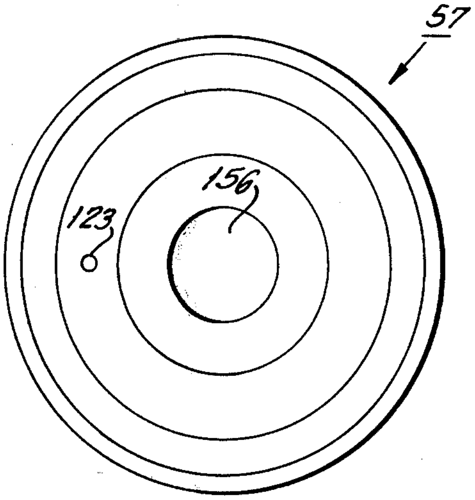
FIG. 4A.
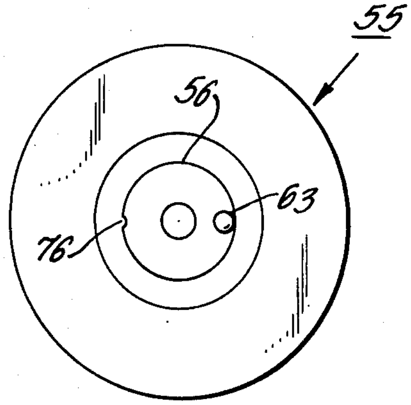
FIG. 6.
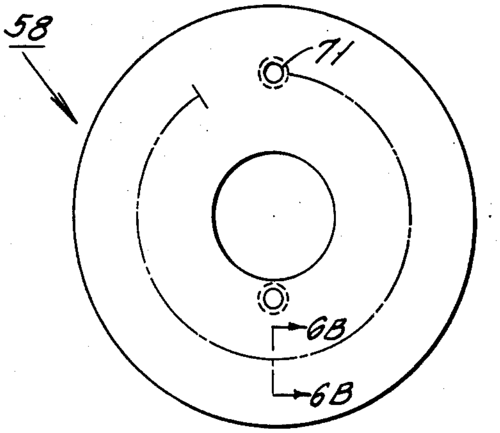
FIG. 6A.
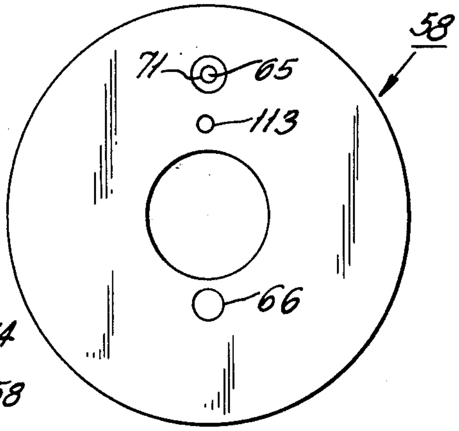
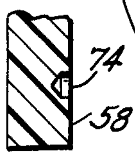
FIG. 6B.

FIG. 9
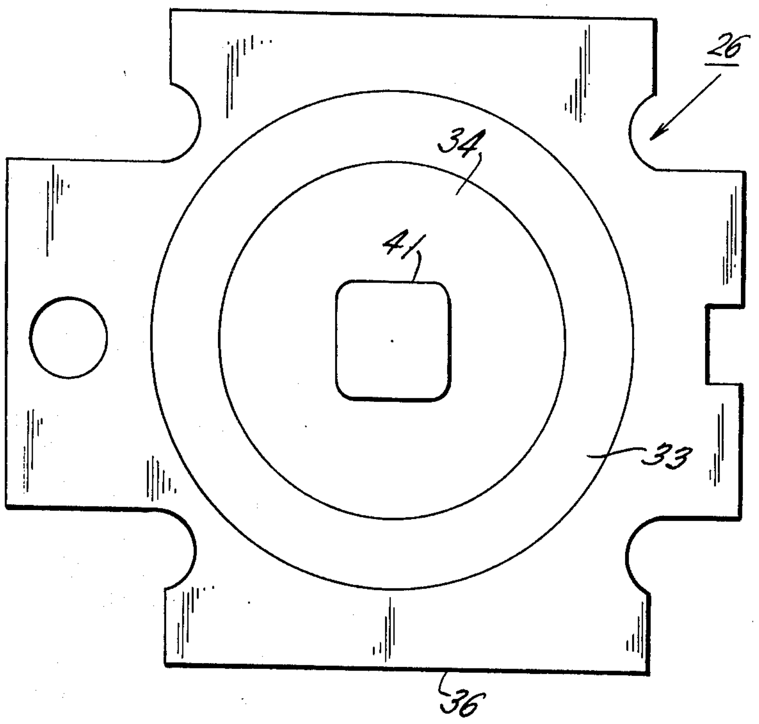
FIG. 10
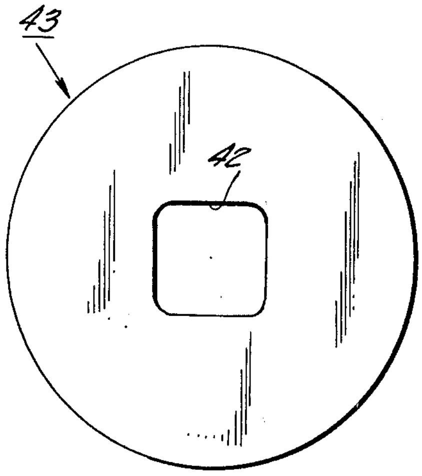
FIG. 11
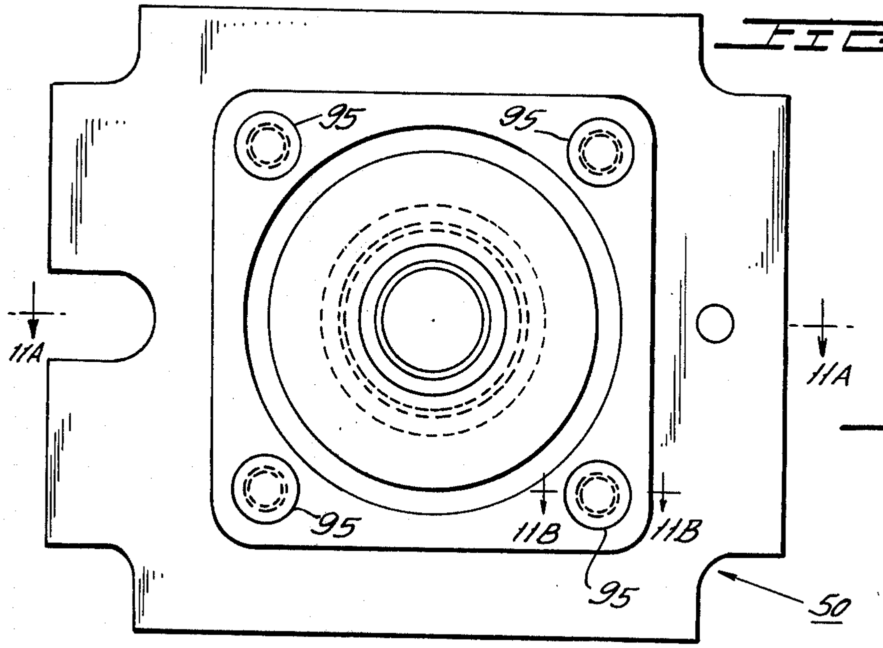
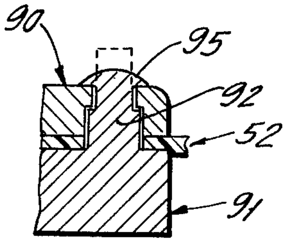
FIG. 11B
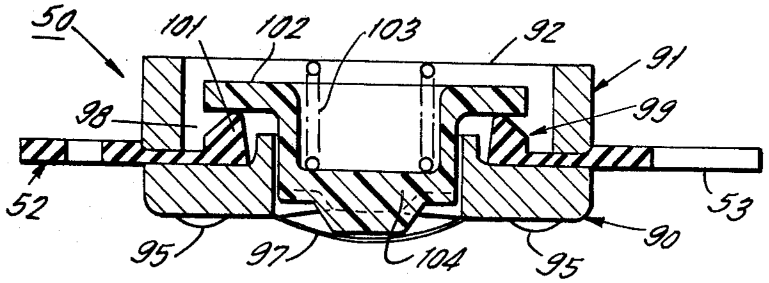
FIG. 11A FIG. 12.
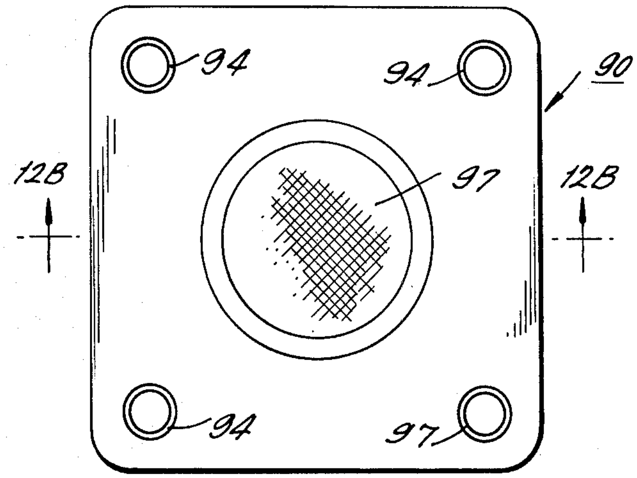
FIG. 13A.
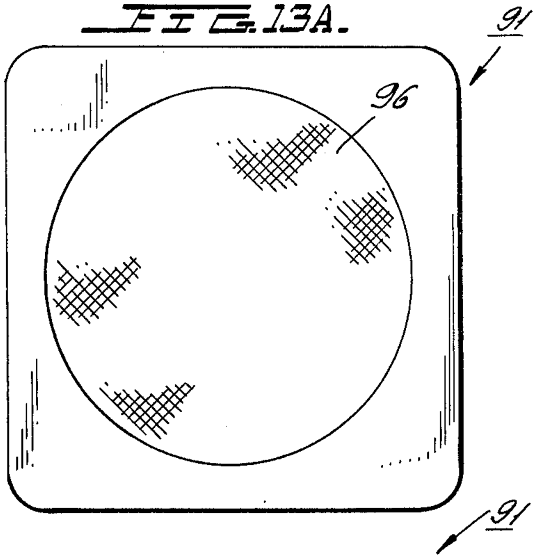
FIG. 12B.
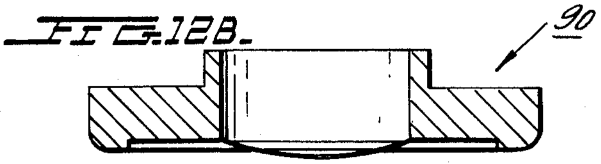
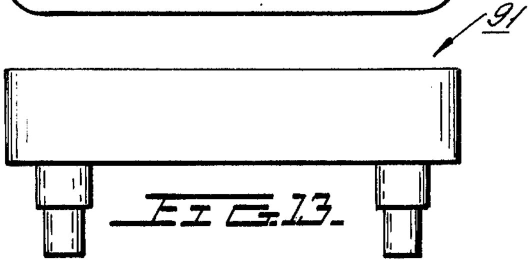
FIG. 13.
FIG. 12A.
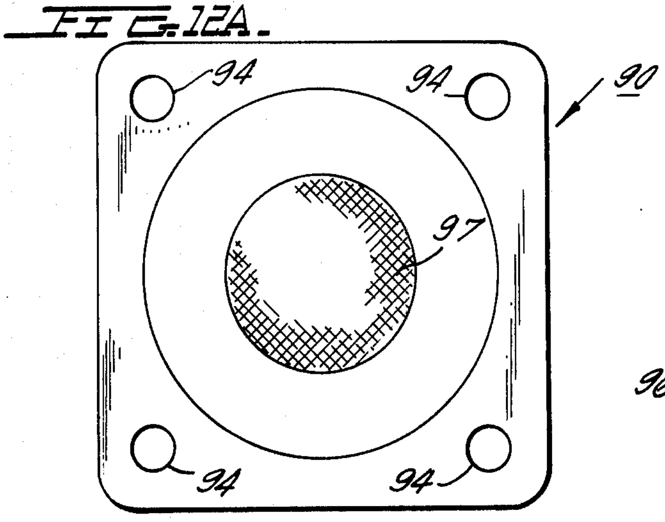
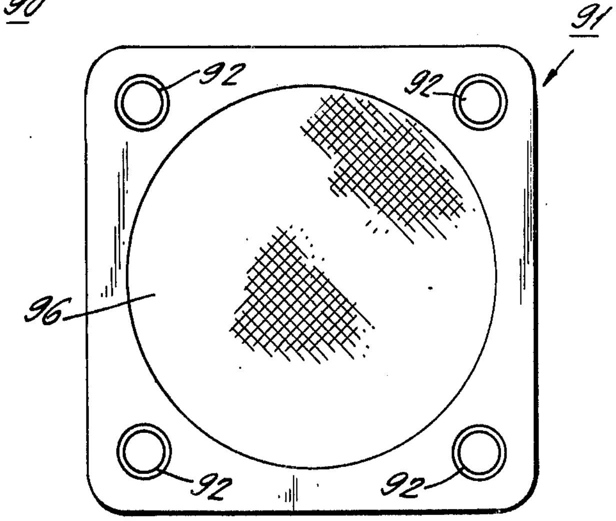
FIG. 13B.
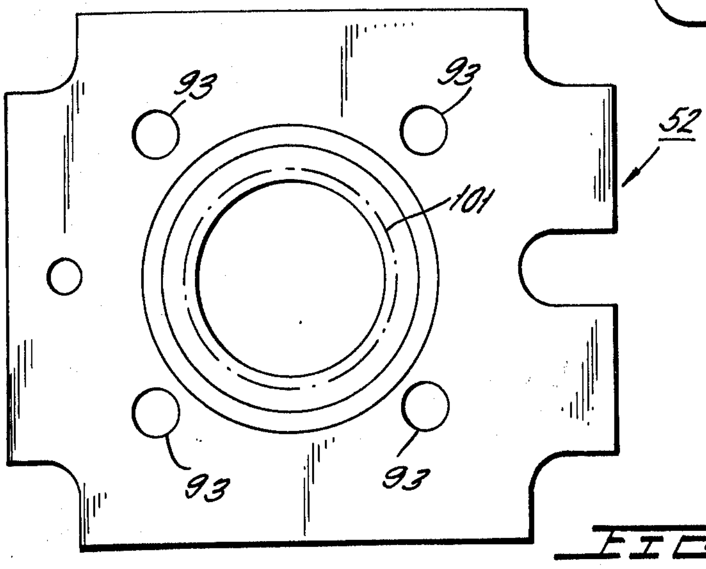
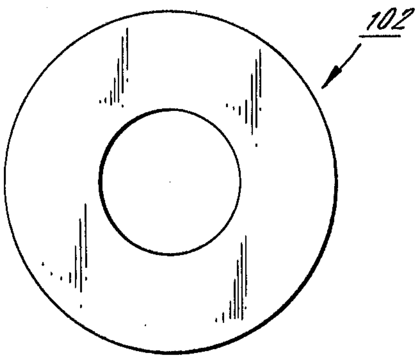
FIG. 15.
FIG. 14.

PNEUMATIC TIMER

This invention relates to pneumatic timing devices and more particularly relates to devices of this type having particular utility when used with electrical switches.

Examples of prior art pneumatic timer constructions are illustrated and described in U.S. Pat. Nos. 2,662,594, 2,981,533, and 3,254,177. In each of these prior art timers there is a normally closed check valve through which air trapped in a timing chamber may be rapidly discharged during a reset stroke. However, during the timing stroke the check valve is closed and air is permitted to enter the timing chamber only at a slow controlled rate, thereby delaying movement of an actuator portion of the timing device, which in turn delays actuation of the switch means or other utilization device controlled by the pneumatic timer.

A major problem limiting the useful life of prior art pneumatic timers is that foreign particles often migrate to the valve seat, causing interference with valve operation and thereby resulting in timing inaccuracies. To eliminate the aforesaid problem the instant invention provides a pneumatic timer construction in which the check valve is part of a sealed filter capsule assembly constructed so that the check valve is subjected only to filtered air, making the valve immune from contamination by air-borne particles.

The instant invention achieves improved timing accuracy by utilizing a check valve that is opened mechanically at the end of the reset stroke. In order to permit this type of operation without complicated linkage mechanisms, the filters of the filter capsule are made flexible enough to follow the valve stroke.

Accordingly, a primary object of the instant invention is to provide an adjustable pneumatic timer construction which maintains timing accuracy over an extended period of time.

Another object is to provide a timer of this type that is of simplified construction.

Still another object is to povide a timer of this type that will not be susceptible to failure as a result of foreign particles migrating to the check valve seat.

A further object is to provide a timer construction of this type having a reduced number of parts that must be absolutely clean during final assembly.

A still further object is to provide a timer construction of this type that permits partial disassembly for reworking without subjecting the valve seat area to contamination.

These objects as well as other objects of this invention shall become readily apparent after reading the following description of the accompanying drawings in which:

FIG. 1 is a plan view of a timing capsule constructed in accordance with teachings of the instant invention.

FIG. 2 is a cross-section taken through line 2—2 of FIG. 1, looking in the direction of arrows 2—2.

FIG. 3 is a bottom view of the timing capsule looking in the direction of arrows 3—3 of FIG. 2.

FIG. 4 is a cross-section of the hold-down cap taken through line 4—4 of FIG. 1, looking in the direction of arrows 4—4.

FIG. 4A is a bottom view of the hold-down cap, looking in the direction of arrows 4A—4A of FIG. 4.

FIG. 5 is a plan view of the dial.

FIG. 5A is a bottom view of the dial.

FIG. 6 is a top view of the orifice plate.

FIG. 6A is a bottom view of the orifice plate.

FIG. 6B is a fragmentary cross-section taken through line 6B—6B of FIG. 6, looking in the direction of arrows 6B—6B.

FIG. 9 is a top view of the diaphragm.

FIG. 10 is a plan view of the diaphragm plate.

FIG. 11 is a bottom view of the filter capsule assembly.

FIG. 11A is a cross-section of the filter capsule assembly taken through line 11A, 11A of FIG. 11, looking in the direction of arrows 11A—11A.

FIG. 11B is a fragmentary cross-section taken through line 11B—11B of FIG. 11, looking in the direction of arrows 11B—11B.

FIG. 12 is a top view of the filter capsule base.

FIG. 12A is a bottom view of the filter capsule base.

FIG. 12B is a cross-section taken through line 12B—12B of FIG. 12 looking in the direction of arrows 12B—12B.

FIG. 13 is a side elevation of the filter capsule cover.

FIGS. 13A and 13B are, respectively, a top and a bottom view of the filter capsule cover.

FIG. 14 is a plan view of the check valve seat member.

FIG. 15 is a top view of the check valve actuator.

Figure 7:
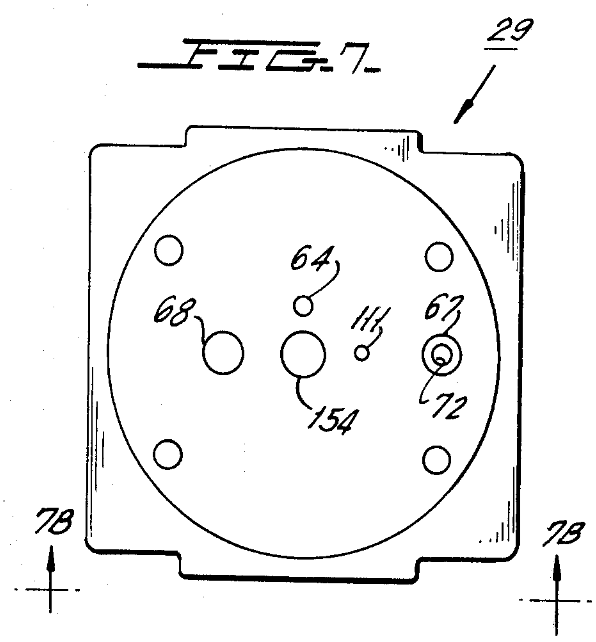
FIG. 7 is a top view of the cover plate.
Figure 7A:
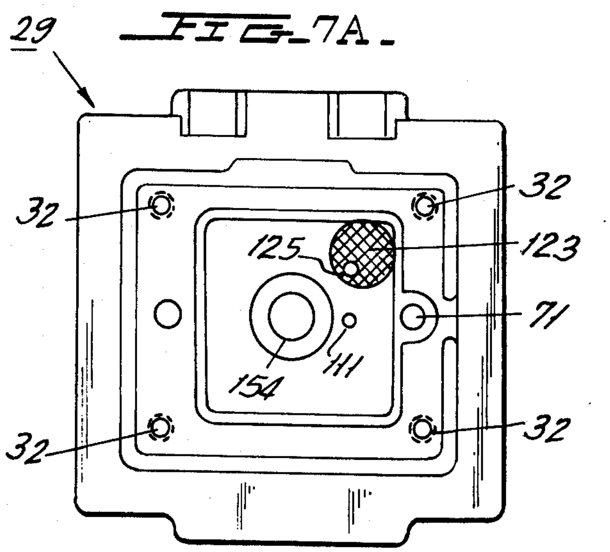
FIG. 7A is a bottom view of the cover plate.

Now referring to the figures. Pneumatic timer 25 of FIGS. 1-3 includes rolling type diaphragm 26 forming a boundary portion of timing chamber 27. The latter is also bounded by internal formations at the bottom of diaphragm housing 28 disposed between cover plate 29 and guide member 30. Four screws 31 extend upward through clearance apertures in guide member 30 and diaphragm housing 28 and are received by threaded apertures 32 (FIG. 7A) in cover plate 29.

Figure 8A:
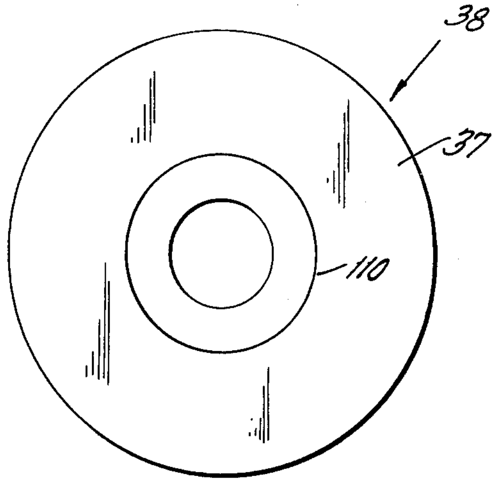
FIGS. 8A and 8B are a top and a bottom view, respectively, of the plunger extension of FIG. 8.
Figure 8:
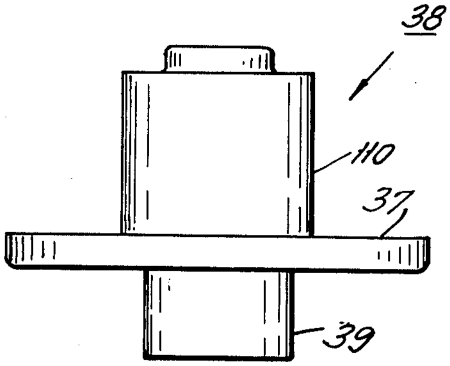
FIG. 8 is a side elevation of the plunger extension.
Figure 8B:
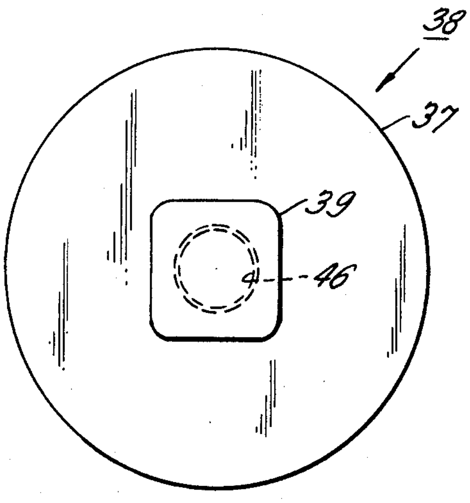
Figure 7B:
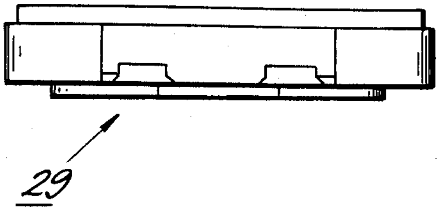
FIG. 7B is a side elevation of the cover plate, looking in the direction of arrows 7B—7B of FIG. 7.

Diaphragm 26 is constructed of flexible plastic and includes annular working portion 33 of inverted U-shaped cross-section having its inner arm connected to flat central section 34 and its outer arm connected to flat outer section 36. Central portion 34 is adjacent the bottom surface of annular protrusion 37 of plunger extension 38. The latter also includes downwardly projecting central rectangular portion 39 and upwardly projecting cylindrical portion 110 (FIGS. 8 and 8A). Portion 39 extends through diaphragm aperture 41 and central aperture 42 of rigid diaphragm plate 43 (FIG. 10) into a rectangular recess at the upper surface of plunger 40. Downward projection 44 of plunger 40 is provided to operate a switch or other utilization device (not shown).

Screw 45 extends upwardly through a central clearance aperture in plunger 40 and is received by threaded aperture 46 at the bottom of plunger extension 38 to apply a force which clamps central portion 34 of diaphragm 26 between plate 43 and protrusion 37, as seen in FIG. 2. Coiled compression spring 46 is disposed around the central portion 149 of guide 30 having a vertical bore through which the portion of plunger 40 having screw 45 passing therethrough extends. The upper end of spring 46 bears against guide member 30 and the lower end of spring 46 bears against plunger 40 to bias the latter downward. Downward movement of plunger 40 is limited by engagement between diaphragm plate 43 and surface 47 at the top of guide member 30. Downwardly extending legs 48, 48 of guide member 30 are provided with inboard grooves which receive projections 49, 49 disposed along opposite sides of plunger 40 to guide vertical movement of plunger 40.

Entry of fastening screw 45 into threaded aperture 46 of plunger extension 38 assembles a group of elements to form a plunger subassembly including plunger 40, biasing spring 46, guide 30, diaphragm plate 43, diaphragm 26 and actuator extension 38.

Disposed within recess 51 in the bottom surface of plate 29 is filter capsule subassembly 50 to be hereinafter described in detail. Subassembly 50 includes stationary valve seat member 52 constructed of very flexible plastic material whose peripheral portion 53 is clamped between diaphragm housing 28 and plate 29 for transverse sealing between the latter two members.

Cover plate 29 is part of a calibration subassembly whose elements are maintained in operative position by screw 54 extending upward through clearance aperture 154 in plate 29 (FIG. 7) and is received by a threaded aperture in downwardly extending stem 56 at the center of round cap 55. Stem 56 extends downwardly through central apertures in dial 57 (156 in FIG. 5), orifice plate 58 and sealing member 59. The latter is interposed between plates 29 and 58. The lower surface of dial 57 is biased against the upper surface of orifice plate 58 by washer spring 61 that surrounds stem 56 and bears against cap 55 and dial 57. Protrusion 63 at the bottom of stem 56 is entered into depression 64 in the upper surface of plate 29 to prevent relative movement between members 55 and 29. Protrusions 65, 66 at the bottom of orifice plate 58 are assymmetrical with respect to the center of plate 58 and are entered into recesses 67, 68, respectively, of cover plate 29 to prevent relative movement between plates 29 and 58.

For a reason to be hereinafter explained, aligned passages 71, 72, 75 through orifice plate 71, cover plate 29, and diaphragm housing 28 respectively, extend from timing groove 74 in the upper surface of orifice plate 58 to timing chamber 27. Also for a reason to be hereinafter explained, the outer surface of stem 56 is provided with axial groove 76.

Filter capsule subassembly 50 (FIGS. 11 and 11A) includes generally rectangular base (FIGS. 12–12B) and generally rectangular top cover 91 (FIGS. 13–13B), the main portions of which are constructed of rigid plastic. Projecting downward from cover 91 near each of the corners thereof are posts 92 which extend through clearance apertures 93 in seat member 52 and clearance apertures 94 in base 90, after which the free ends of post 92 are heated and spread to form enlarged head 95 (FIG. 11B) to maintain the relative operation positions of elements 52, 90, and 91.

The upper surface of cover 91 is formed of taut nylon mesh filter screen 96 and the lower surface of base 90 is formed with nylon mesh filter screen 97 that is downwardly bowed at its center. Screens 96, 97 are fused to the respective elements 91, 90 to cover central openings therethrough. Disposed within cavity 98 formed through the cooperation of base 90 and cover 91 is check valve 99 including stationary annular seat portion 101, movable valve member 102, and biasing spring 103. The latter bears against the inner surface of screen 96 and extends into a recess in the upper surface of movable valve member 102 to bias the lower surface thereof against the inner surface of screen 97 and also to bias check valve 99 closed. Reduced diameter guide portion 104 at the bottom of movable valve member 102 is relatively closely fitted to the central aperture of base 90 for guidance of member 102 during operation of valve 99. Both of the unsealed openings to recess 98 are covered by filter screens 96, 97 so that check valve 99 is protected against contamination from air-borne particles.

Operation of timer 25 takes place as follows. In the reset stroke a force applied to plunger 40 as by an electromagnet (not shown) imparts upward movement to plunger 40. This movement is essentially unimpeded since air expelled from timing chamber 27 moves upward in space 160 between upper portion 110 of plunger extension 38 and the central guide bore of diaphragm housing 28, through lower filter screen 97, through check valve 99, through upper filter screen 96, through aligned reset passages or apertures 111, 112, 113 in their respective elements 29, 59, and 58, into space 114 between the bottom of dial 57 and the top of plate 58, through axial groove 76 in stem 56 of cap 55, and through the space 116 between the outer edge of cap 55 and the inner surface of annular indicia bearing section 117 of dial 57. Near the end of the upward reset stroke the upper end of actuator 38 engages lower filter screen 97. This is the position shown in FIG. 2. Continued upward movement of actuator 38 is transmitted to movable valve member 104 through the flexing of screen 97 to mechanically open check valve 99 against the force of its biasing spring 103.

In the timing mode all mechanical forces acting upward on plunger 40 are removed and the latter moves downward under the action of spring 46. However, this downward movement of plunger 40 is retarded in that as soon as check valve 99 closes, air cannot move downward through filter capsule assembly 50 into timing chamber 27. Now, the air passage into timing chamber 27 is through extremely small cross-section timing groove or passage 74 and then through aligned passages 73, 72 and 75. Air is drawn into groove 74 through aperture 125 at the bottom or recess 123 in dial 57. Air entering aperture 125 passes through filter 124 disposed within recess 123. The length of the timing interval, or time during which it takes plunger projection 44 to operate a utilization device after plunger 40 begins its downward movement under the influence of main spring 46, is controlled by the position of angularly adjustable dial 57 relative to angularly fixed orifice plate 58 which establishes the position of aperture 125 along timing groove 74. This type of operation is explained in detail in the aforesaid U.S. Pat. No. 2,662,594.

Thus, it is seen that the instant invention provides a simplified construction for a pneumatic timer in which final assembly may take place without the danger of contaminating the check valve with air-borne particles in that the check valve is part of a sealed subassembly having filters over all unsealed apertures. Further, timing accuracy is maintained by mechanically opening the check valve near the end of the reset stroke.

Although there have been described preferred embodiments of this novel invention, many variations and modifications will now become apparent to those skilled in the art. Therefore, this invention is to be limited not by the specific disclosure herein but only by the appending claims.

The embodiments of the invention in which an exclusive privilege or property is claimed are defined as follows:

1. A timing device comprising a filter capsule subassembly including a housing means defining a cavity, check valve means disposed within said cavity, said device also comprising means defining a timing chamber, a plunger operatively connected in said chamber and mounted for movement in opposite directions in a timing and a reset stroke, a main spring urging said plunger to move in said timing stroke, means defining a reset passage, including said check valve means when open, connecting said timing chamber to ambient and proportioned to permit free movement of said plunger in said reset stroke, means defining a restricted timing passage by-passing said check valve means when closed and connecting said timing chamber to ambient thereby retarding movement of said plunger in a controlled manner during said timing stroke, said housing means including unsealed opening means communicating with said cavity, and said subassembly also including filter means covering all of said unsealed opening means.

2. A timing device as set forth in claim 1 in which said unsealed opening means includes first and second portions on opposite sides of said check valve means and said filter means includes first and second screens covering, respectively, said first and second portions of said opening means.

3. A timing device as set forth in claim 2 in which there is a valve spring disposed within said cavity bearing against said first screen and normally biasing said check valve means closed.

4. A timing device as set forth in claim 3 in which the check valve means includes a movable valve and a stationary seat normally engaged by said valve to close said valve means, said movable valve bearing against said second screen.

5. A timing device as set forth in claim 4 in which said screens are flexible so that said valve may be moved mechanically by a force applied thereto through said second screen.

6. A timing device as set forth in claim 5 in which said housing is constructed of a rigid plastic and said screens are constructed of a plastic mesh fused, along boundary portions thereof, to said housing.

7. A timing device as set forth in claim 1 also comprising a calibration subassembly, a diaphragm housing and a diaphragm subassembly; said diaphragm housing being interposed between said diaphragm and said calibration subassemblies; said diaphragm subassembly including a diaphragm and said diaphragm housing defining said timing chamber wherein said diaphragm is disposed; another cavity formed between said diaphragm housing and said calibration subassembly; said filter capsule subassembly being disposed within said another cavity.

8. A timing device as set forth in claim 7 in which the diaphragm assembly includes said plunger for actuating means external of said timing device at the end of said timing stroke and said main spring biasing; said diaphragm connected to said actuating means and having a portion within said timing chamber and being subjected to a rolling-like motion during movement of said actuating means.

9. A timing device as set forth in claim 8 in which said unsealed opening means includes first and second portions on opposite sides of said check valve means and said filter means includes first and second screens covering, respectively, said first and second portions of said opening means, a valve spring disposed within said cavity bearing against said first screen and normally biasing said check valve means closed, said check valve means including a movable valve and a stationary seat normally engaged by said valve to close said valve means, said movable valve bearing against said second screen, said screens being flexible so that said valve may be moved mechanically by a force applied thereto through said second screen.

10. A timing device as set forth in claim 9 in which at the end of a reset stroke said actuating means mechanically opens check valve means by applying a force through the second screen to move said valve away from said seat.

* * * * *